United States Patent
Davis, III et al.

(10) Patent No.: US 9,036,454 B2
(45) Date of Patent: May 19, 2015

(54) HANDHELD FORESTRY DEVICE

(75) Inventors: Richard W. Davis, III, Tallahassee, FL (US); Mark M. Milligan, Tallahassee, FL (US); Brian Holley, Tallahassee, FL (US)

(73) Assignee: Forestech Consultuing, Inc., Tallahassee, FL (US)

( * ) Notice: Subject to any disclaimer, the term of this patent is extended or adjusted under 35 U.S.C. 154(b) by 681 days.

(21) Appl. No.: 13/405,998

(22) Filed: Feb. 27, 2012

(65) Prior Publication Data

US 2013/0223189 A1    Aug. 29, 2013

(51) Int. Cl.
| | |
|---|---|
| G01B 5/00 | (2006.01) |
| G01B 5/02 | (2006.01) |
| G01C 15/00 | (2006.01) |
| G01S 15/02 | (2006.01) |
| G01S 15/10 | (2006.01) |
| G01S 15/74 | (2006.01) |

(52) U.S. Cl.
CPC ............. *G01S 15/025* (2013.01); *G01C 15/00* (2013.01); *G01S 15/10* (2013.01); *G01S 15/74* (2013.01)

(58) Field of Classification Search
USPC .................. 367/118, 127, 124, 126; 144/356; 356/601, 634
See application file for complete search history.

(56) References Cited

U.S. PATENT DOCUMENTS

| | | | | |
|---|---|---|---|---|
| 6,141,091 A | * | 10/2000 | Ball | 356/146 |
| 6,862,083 B1 | * | 3/2005 | McConnell et al. | 356/4.01 |
| 7,315,794 B1 | * | 1/2008 | Willis | 702/159 |
| 8,539,685 B2 | * | 9/2013 | Amor | 33/290 |
| 2002/0191198 A1 | * | 12/2002 | Dunne et al. | 356/635 |
| 2003/0174305 A1 | * | 9/2003 | Kasper et al. | 356/3.09 |
| 2006/0100816 A1 | * | 5/2006 | Prentice et al. | 702/127 |

* cited by examiner

*Primary Examiner* — Isam Alsomiri
*Assistant Examiner* — Hovhannes Baghdasaryan
(74) *Attorney, Agent, or Firm* — J. Wiley Horton; Adrienne C. Love

(57) ABSTRACT

A rugged hand-held mobile computing device for a forester to collect and use dendrometric data from trees and tree stands is claimed. The device includes a processor which operates in connection with a memory, a user interface, a GPS receiver, a sound sensor capable of emitting an ultra-sonic pulse and a computer readable code embodied on the memory. The device communicates with a transponder by way of the ultrasonic pulse emitted by the sound sensor. The transponder also emits an ultra-sonic pulse back to device. The device calculates the distance traveled based on the knowledge of the speed of the pulses. The memory, which also includes basic mapping software, uses the data to update a map in real time with the location of the trees and other information collected.

11 Claims, 11 Drawing Sheets

HANDHELD FORESTRY DEVICE

BACKGROUND OF THE INVENTION

1. Field of the Invention

This invention relates to the field of devices for collecting environmental data. More specifically, the present invention comprises a device for collecting data from the environment.

2. Description of the Related Art

Forestry is a profession which attempts to manage, use and conserve forests and related resources in a sustainable manner and for human benefit. The collection of environmental data associated with a forested area is essential to forestry. Collection of data samples within particular areas includes, but is not limited to, the density of the forest or mapping of trees and dendrometric measurements (diameters of the trees, height of the trees, etc). Action can be taken based on the collected data. For example, if a particular area is overstocked, the area may be thinned.

Global Positioning System ("GPS") technology is known and has assisted with the collection of data in the field. A forester often carries a hand-held device with built-in GPS technology that provides real time positional data as he or she navigates the forest. Rugged hand-held devices often include basic mapping software which includes lines, areas and points allowing for computer aided mapping of forestry data on a map in real time.

Foresters also carry several external electronic devices to assist with the collection of data. For example, typical devices include laser rangefinders, inclinometers, accelerometers, etc. However, it is often cumbersome to use multiple different electronic devices and difficult to integrate data in real time as the data is collected. Additionally, the use of ultra-sound sensor devices is known, however these devices are cumbersome and create a numerical reading which has to be recorded apart from the device.

Therefore what is needed is one device which allows for easy and efficient collection and integration of environmental data in the field in real time.

BRIEF SUMMARY OF THE PRESENT INVENTION

The present invention is a rugged hand-held device used to collect and use dendrometric data from trees and tree stands. The device is comprised of a mobile computing device having a memory with a computer readable code, a user interface, a GPS receiver and a sound sensor capable of emitting an ultra-sonic pulse. The device communicates with a transponder, also capable of emitting an ultra-sonic pulse. The device emits a first ultra-sonic pulse, which travels at a speed (which is dependent on the ambient temperature). The first ultra-sonic pulse travels to the transponder which is triggered to emit a second ultra-sonic pulse back to the device. The programming within the device has knowledge of the speed of the pulses and therefore can calculate the distance traveled. The device performs this distance measurement three times and averages the distances. If the variance of any one of the distances from the average distance is too great, the device will return an error message to the user.

In general, the device has a processor which operates in connection with the memory and retrieves an instruction from the memory, decodes and executes the instruction. Once the instruction is executed the processor writes the results back to the memory. For example, if the distance measurement is calculated accurately the average distance would be written back to the memory. The memory, which also includes basic mapping software, could use that data to update a real time map with the location of the trees using the average distance. The basic mapping software interacts with a GPS receiver and optionally with an electronic compass to display the real time map on the user interface of the device.

The device also collects data from various sensors, for example, external data is collected by way of an accelerometer, a laser rangefinder, a camera and a temperature sensor. The data is stored in the memory in real time and can be added to mapping or graphing functions on the device. These functions allow the user to collect and use all of the data in one device, allowing for the real time ability to map the location, height and size of trees in an area or plot of land.

REFERENCE NUMERALS IN THE DRAWINGS

| | |
|---|---|
| 10 device | 12 back |
| 14 top | 16 camera |
| 18 laser exit point | 20 sound distance sensor |
| 22 keypad | 24 front |
| 26 user interface | 28 temperature sensor |
| 30 forester | 32 tree |
| 34 laser beam | 36 first ultrasonic pulse |
| 38 processor | 40 electronic compass |
| 42 GPS receiver | 44 laser rangefinder |
| 46 LED | 48 basic mapping software |
| 50 accelerometer | 52 memory |
| 54 height value cells | 56 second ultrasonic pulse |
| 58 plot | 60 plot center |
| 62 transponder | 64 cross |
| 66 distance method cell | 68 distance cell |
| 70 height input cells | |

DETAILED DESCRIPTION OF INVENTION

Figure 1:
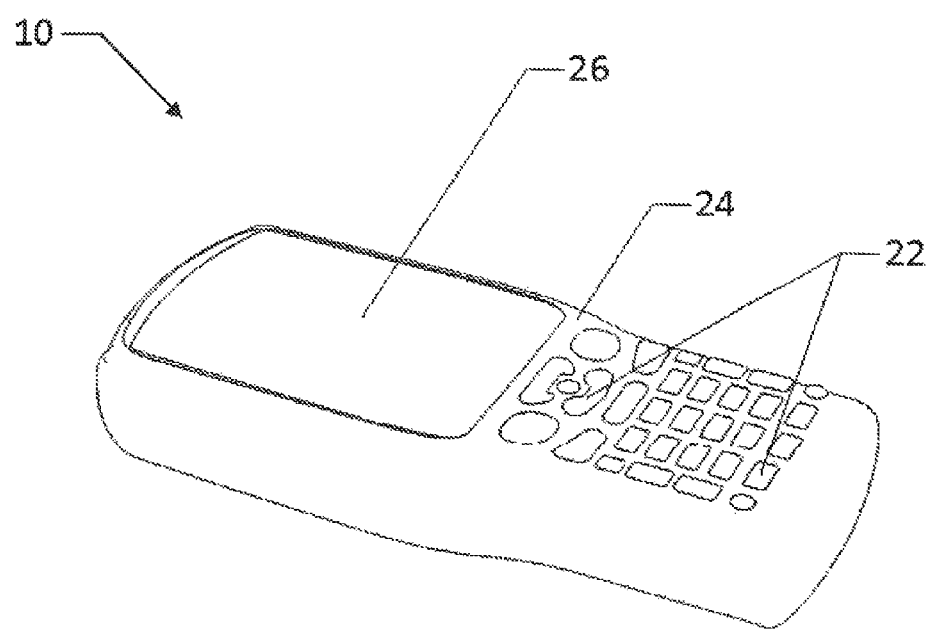
FIG. 1 is a perspective view, showing the present invention.

Rugged hand-held devices are commonly used to collect environmental data. Prior art rugged hand-held devices include basic mapping software which includes lines, areas and points allowing for computer aided mapping of forestry data on a map in real time. FIG. 1 shows the present invention, a rugged hand-held mobile computing device 10. The front 24 of device 10 appears like a typical prior art hand-held device, including user interface 26 (e.g. screen) and keypad 22. Keypad 22 is used to enter manual commands into device 10 or trigger the device to take other actions.

Figure 2:
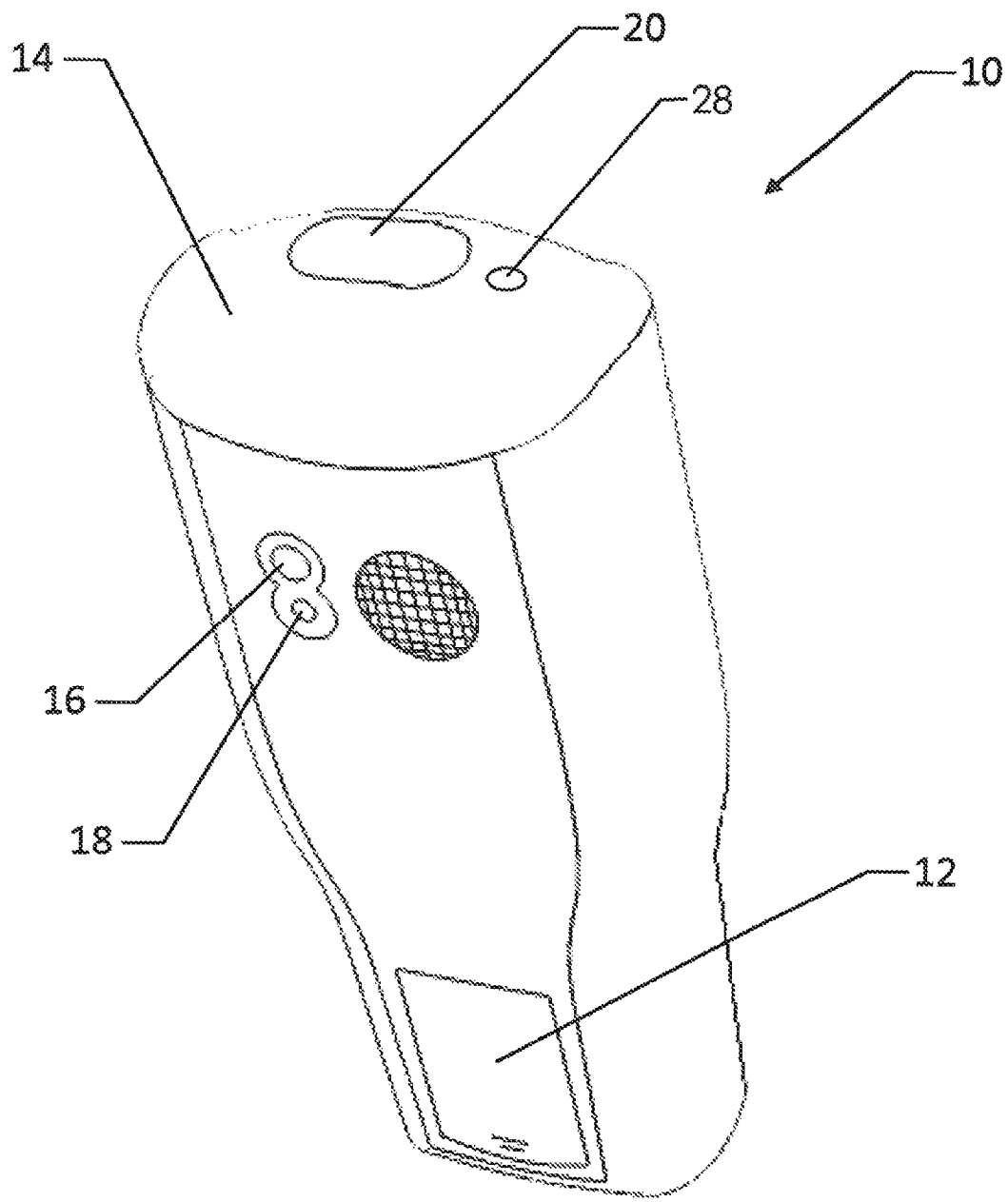
FIG. 2 is a perspective view, showing the present invention.

FIG. 2 is a perspective view showing the present device 10 from the back. Back 12 of device 10 shows camera 16 and laser exit point 18. Top 14 of device 10 includes a sound distance sensor 20. Sound distance sensor 20 is built-in to the device and is preferably an ultra-sound sensor along with a temperature sensor 28. Temperature sensor 28 reads the outside temperature at the time the device 10 is directed to take a distance measurement using sound distance sensor 20. The device 10 incorporates the calculated temperature into the formula which determines the distance. This is necessary due to the fact that the outside temperature affects the speed of sound. Molecules at higher temperatures have more energy and can vibrate faster. Since the molecules vibrate faster, sound waves travel more quickly as the temperature rises and vice versa.

Figure 3:
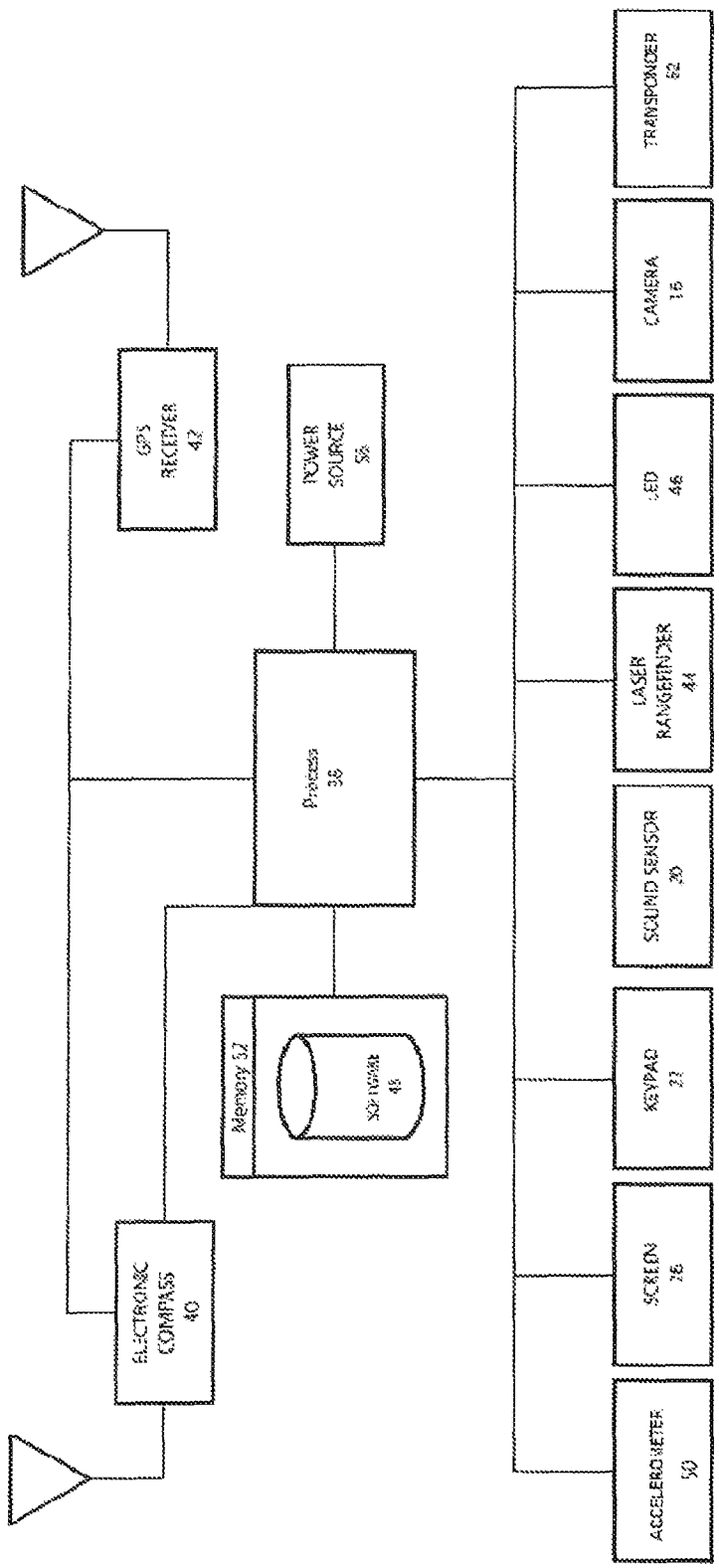
FIG. 3 is a schematic view, illustrating the device hardware architecture.

The key components of the present device are shown in FIG. 3 as a schematic view of the device hardware architecture. Device contains processor 38 (e.g. microprocessor or any device housing a central processing unit "CPU"). Processor 38 is preferably an 800 Mhz processor or higher. Processor 38 operates in connection with memory 52. Processor 38 generally operates by retrieving an instruction from memory 52. The instruction is decoded and executed. Once executed, processor 38 writes the results back to memory 52. While it is not illustrated in detail, device hardware, such as accelerometer 50, user interface 26, sound sensor 20, laser rangefinder 44, and other hardware, would use memory 52 to store specific device software. Additionally, manual inputs from external devices would be, in some instances, stored in memory 52. Memory also contains basic mapping software 48 which includes lines, areas and points and a forestry data dictionary. The basic mapping software 48 interacts with GPS receiver 42 and optionally with electronic compass 40 to display a real time map to the user on user interface 26 illustrating the data retrieved, locational data and other data collected. Electronic compass 40 is preferably a magnetometer which detects magnetic direction. A magnetometer can be optionally used in the present device to record magnetic fields and locations automatically as a supportive subsystem to GPS receiver 42. Electronic compass 40 allows the user to incorporate tree mapping on a plot of land or sample point. GPS receiver 42 collects information from satellites and interprets that information to determine an exact location. The receiver can determine the position of device and display it on the user interface 26 in an electronic map. As data is collected from various sensors, the data is stored in real time and can be added to mapping or graphing functions on the device 10. As illustrated, external data can be collected from a accelerometer 50. Accelerometer 50 collects data relating to the tilt of an object, in this case typically a tree. The accelerometer 50 in connection with other data input can help to determine the location and height of a tree on a plot of land. Sound sensor 20 operates to collect data relating to 2D or 3D location of objects, distance and height data. Laser rangefinder 44, is optionally included and also acts to provide location of objects, distance and height data. Camera 16 can take pictures of an area and additionally act in connection with other sensors to take accurate data measurements, such as serving as the viewer for height, laser measurements and possibly additional measurements. User interface 26, keypad 22 and LED 46 all provide assistance to the user, or forester, enabling the user to interact with device 10. The present device, importantly, provides the user with the ability to collect and use all data input in one device, thereby providing for a comprehensive, real time ability to map the location, height and size of trees in an area or plot of land.

Figure 4:
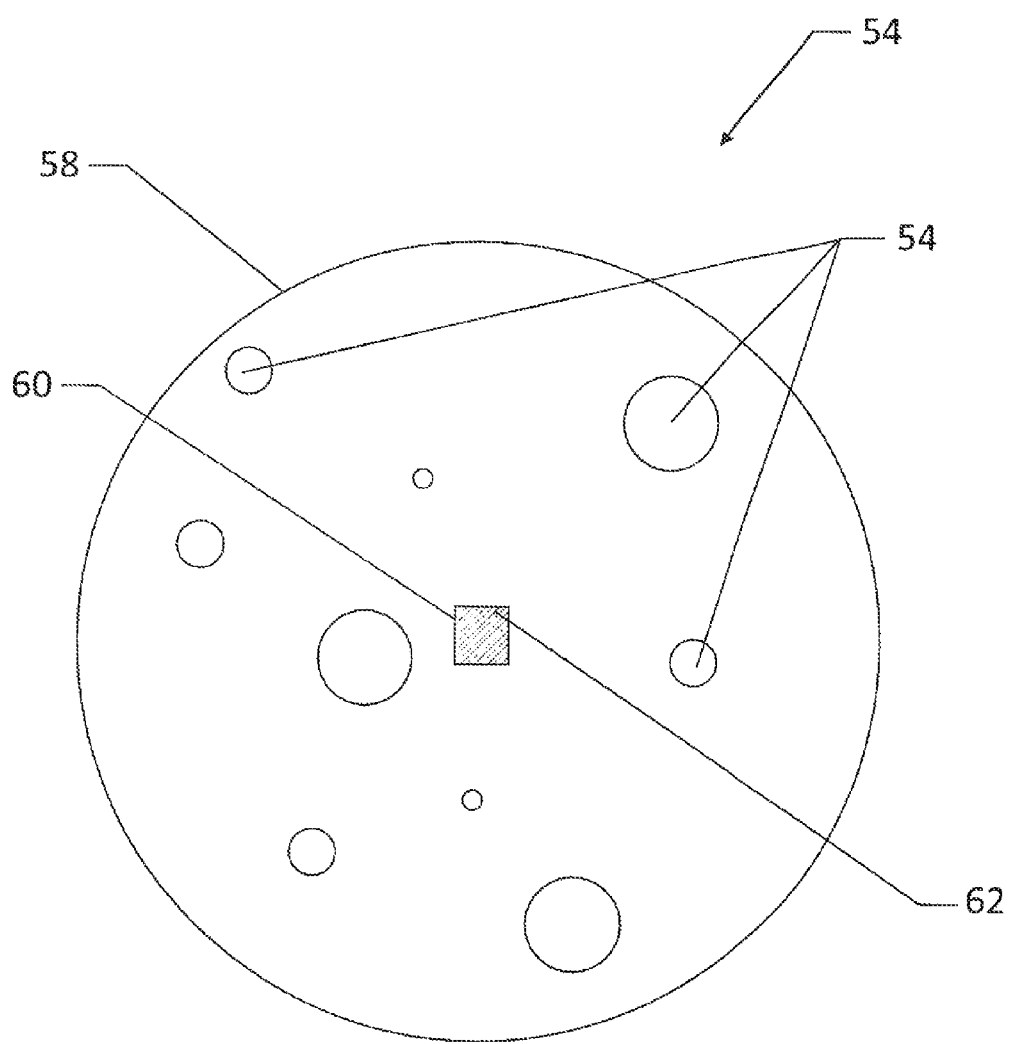
FIG. 4 is a graphical view, showing a tree map on a plot of land.

FIG. 4 illustrates an example of one type of tree map. The mapping of the trees 32 on a plot 58 uses the sound sensor 20 and electronic compass 40. As shown, trees 32 are mapped in relation to a plot center 60 located in the middle of a plot 58. In the present example, the respective widths of the particular mapped trees are also displayed. The forester typically takes measurements using the sound sensor 20 from the tree that the forester is measuring. The forester sets up a transponder 62 at plot center, typically on top of a plot center pole, and can walk from tree to tree pointing the device in the direction of the transponder to determine the distance from the tree back to the plot center. A reciprocal bearing (or back bearing) is calculated by the internal electronic compass within device 10, which allows the trees to be mapped accurately in respect to the plot center. The use of the sound sensor 20 is effective due to the fact that sound is not disrupted by foliage, trees or other underbrush.

Device 10 can be used in a variety of ways to take accurate measurements. Forestry tree plots, as discussed above, are mapped using a plot center 60 as a guide that has a known or observed latitude and longitude. In prior art methods, a forester would typically physically place a measurement tape from the tree to the plot center or the plot center to the tree. In the alternative, the forester could use a laser rangefinder; however, one interruption of the laser by underbrush could cause the distance to be unattainable.

Figure 5:
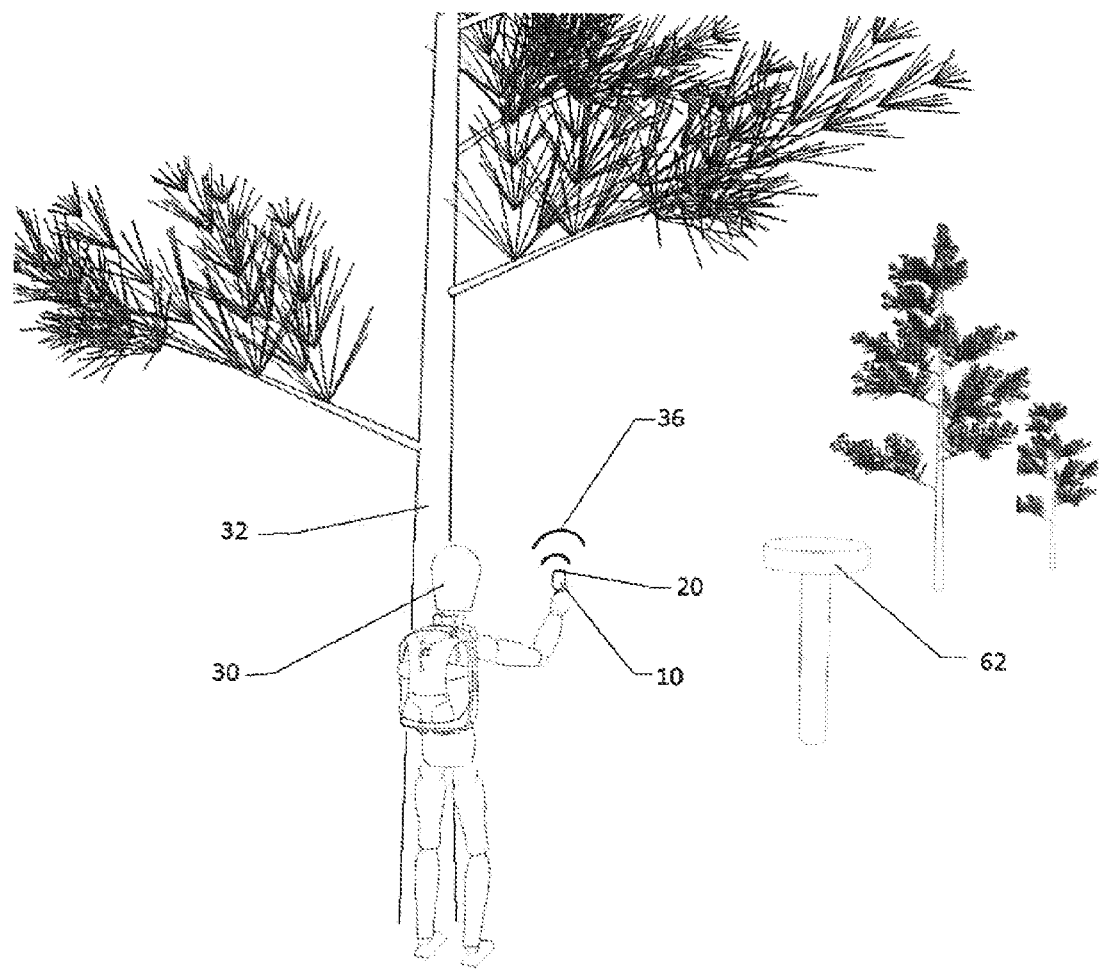
FIG. 5 is a perspective view, showing a forester using the present device.

In the present example, as illustrated in FIG. 5, the forester 30 sets up a transponder 62 at plot center 60. Next, forester simply and efficiently walks from tree to tree 32 pausing at each tree to point device 10 at transponder 62. Sound sensor 20 emits an ultrasonic pulse (first ultrasonic pulse 36) that penetrates through foliage, trees and/or underbrush to be received by transponder 62. Transponder 62 accepts first ultrasonic pulse 36 and sends a second ultrasonic pulse 56 back to sound sensor 20 on device 10 (in the alternative, transponder 62 could simply reflect an ultrasonic pulse back to device). The computer readable code or programming within the device measures the exact elapsed time from the emission of the first ultrasonic pulse 36 until receiving second ultrasonic pulse 56 back from transponder 62. Due to the knowledge of the speed of the ultrasonic pulses and the surrounding air temperature, programming within device 10 is able to calculate the distance ultra-sonic pulse traveled and therefore the correct distance (first distance) from device 10 (e.g. tree 32) to transponder 62 (e.g. plot center). The device 10 automatically performs multiple measurements averaging the values for a more accurate calculation. In the preferred embodiment, the device completes the measurement cycle two additional times, calculating a second distance and a third distance. Using the three measurements the device (processor or programming within the device) calculates the mean distance or average distance. In the event that any one of the measurements is greater than +/−1% of the mean of the measurements, the device will show an error message. Thus, if the variation from the mean is too great, the error message will appear. If an error message occurs the forester is advised that the measurements may be inaccurate, based on any number of reasons, including, that the device is out of range or was moving during the measurement. This type of error message can be extremely beneficial to the forester by ensuring accurate measurements.

The present device 10 is especially important in that device 10 records the calculated distances for future use and can immediately incorporate the data into a visual guide for the forester. As further described below, measurements other than distance measurements can be taken, recorded and integrated as well.

Device 10 also allows for efficient calculation of the height of the trees, using three separate methods. It is preferable that the device has a laser method, manual method and a sound sensor method. The first method, laser method, shown in FIGS. 6 and 7, uses the laser rangefinder and the accelerometer. Forester 30 holds device 10 and aims the device 10 at any point on tree 32 where there is a clear line of sight. User interface 26 acts as a visual aid for forester 30 by utilizing camera 16. Camera 16 provides an image of tree 32 and point on tree 32 where laser is pointed in real time while forester is taking and calculating data measurements. While holding the device 10, forester 30 selects the method of determining distance.

Figure 6:
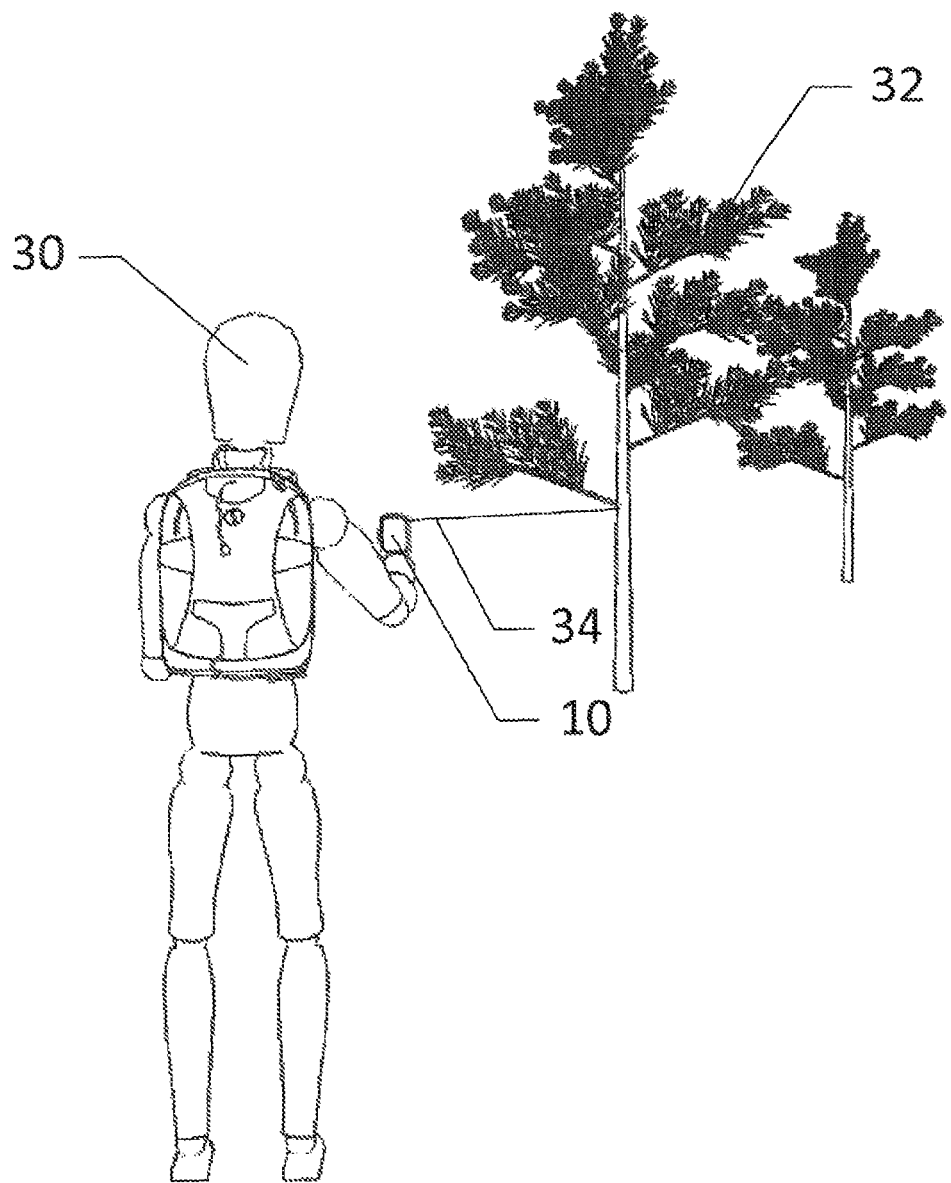
FIG. 6 is a perspective view, showing a forester using the present device.
Figure 7:
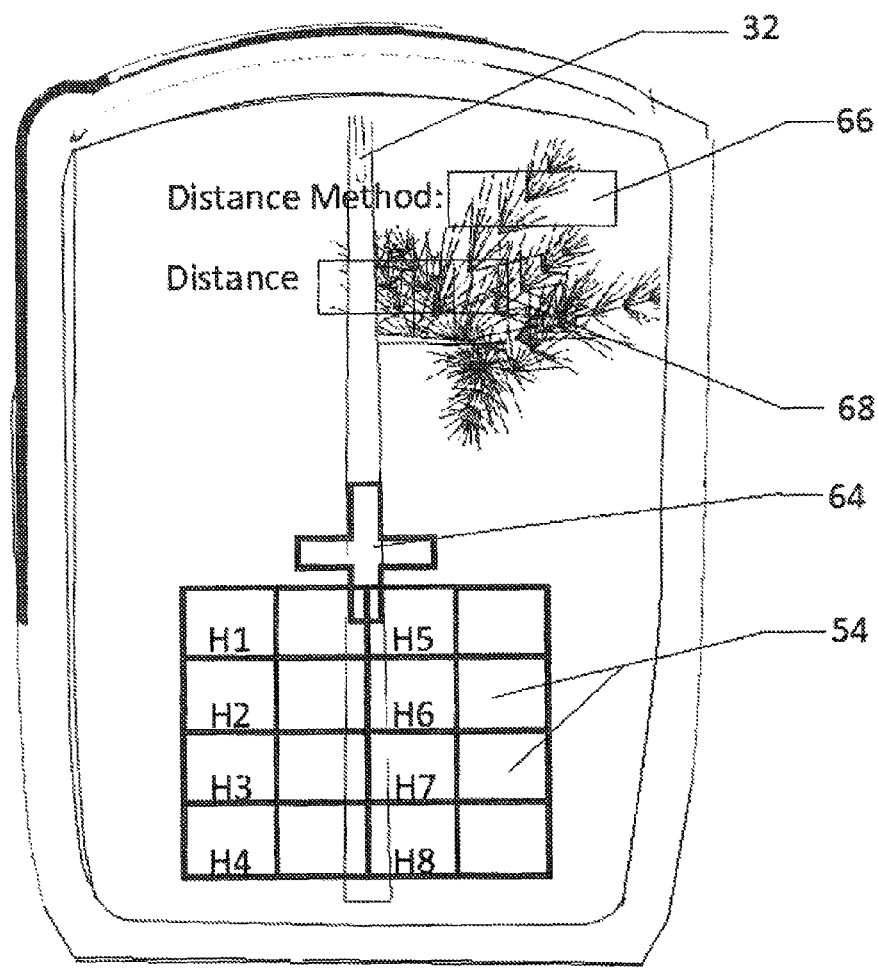
FIG. 7 is a screen view, showing the view the forester has using the present device.

FIG. 7 shows a view of user interface 26 during the action depicted in FIG. 6. User interface 26 shows the user what method has been chosen in distance method cell 66. The camera function is activated such that forester can accurately view the object at which laser beam is directed (e.g. tree 32). User interface 26 also includes cross 64. Cross 64 acts as a target for forester 30 to select the correct point on tree 32 to direct the laser beam and thereby take the specific measurement. Optional text can be included on user interface 26. In the present embodiment user interface 26 shows the distance method cell 66, distance cell 68 and height value cells 54, having values at X number of heights to the user. This text is preferably in a translucent font such that the user can view the image through the camera lens through the text. Once forester 30 chooses the laser method, the forester 30 points cross 64 at a clear point on the tree 32. Forester 30 commands device 10 to take a straight line distance measurement. A value in the distance cell 68 is populated on the user interface 26. This distance measurement is calculated based on the laser rangefinder device.

Figure 8:
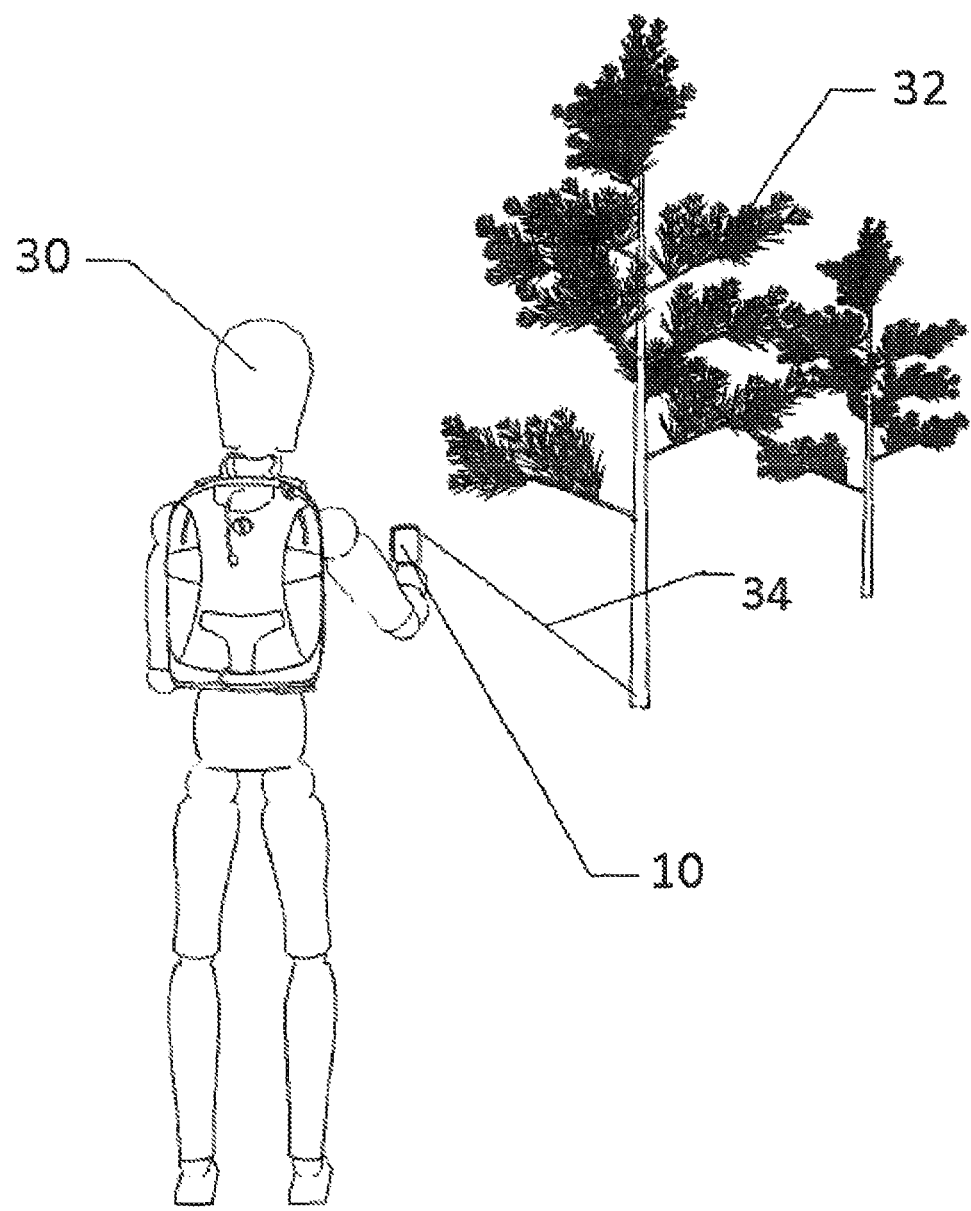
FIG. 8 is a perspective view, showing a forester using the present device.
Figure 9:
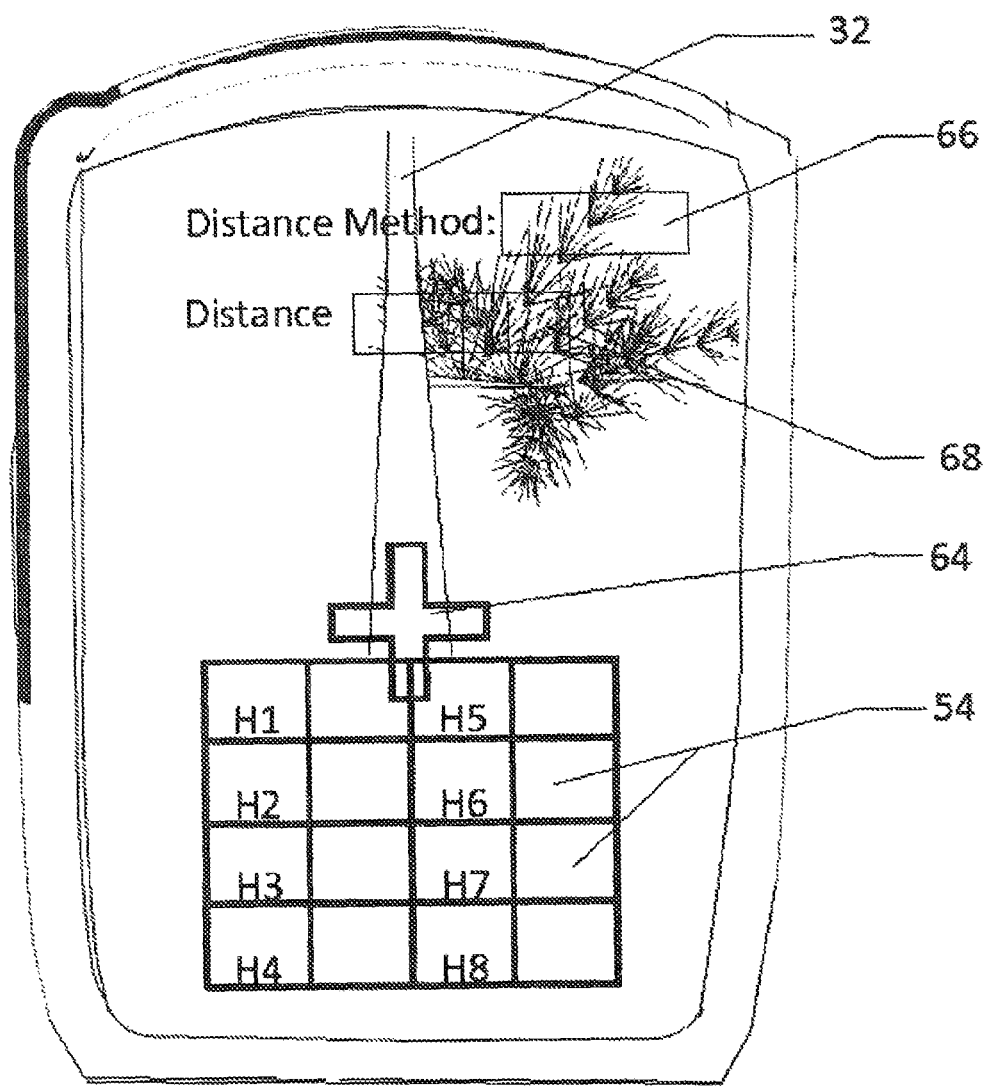
FIG. 9 is a screen view, showing the view the forester has using the present device.

Next, forester 30 tilts the device 10 such that the cross 64 is aimed at the base of the tree 32, as illustrated in FIGS. 8 and 9. Forester 30 commands device to store the angle to the base of the tree. Forester 30 moves up from the base of the tree taking angular measurements at chosen intervals. These angular measurements are calculated using the device's built-in accelerometer 50 (see FIG. 3). The device calculates the heights at each interval by using a set formula which utilizes the stored data, the horizontal distance to the tree and the degree of the angular measurement (the device also takes into consideration the potential for negative degree values). The height at each chosen interval is calculated and the appropriate height input cell 70 on user interface 26 is populated. It is in this manner that forester can immediately recognize the height of the tree at different points and maintain real time records of the information. Additionally, the distance from the user to the tree is only required for the initial measurement and not at every desired height point.

Figure 10:
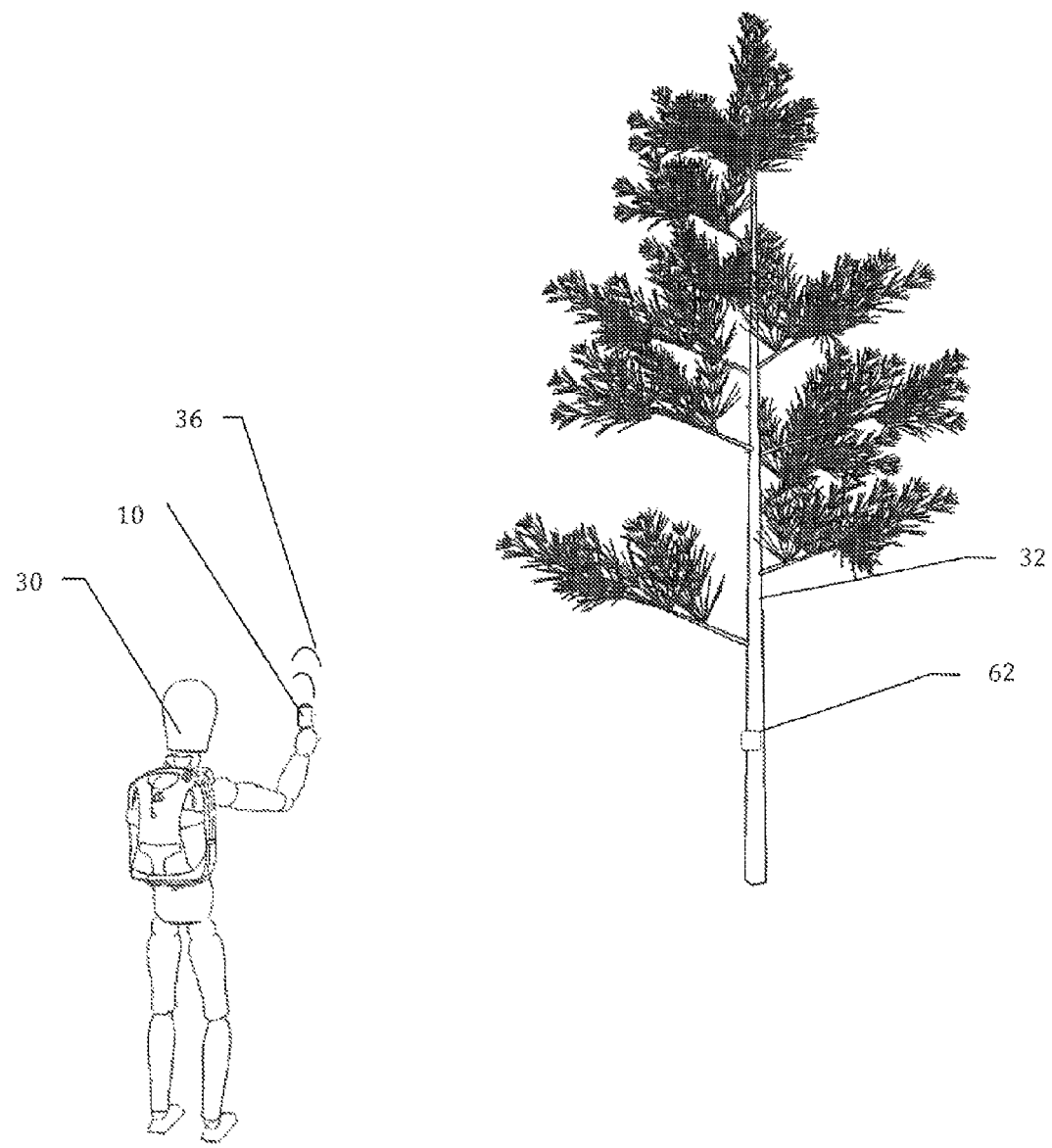
FIG. 10 is a perspective view, showing a forester using the present device.
Figure 11:
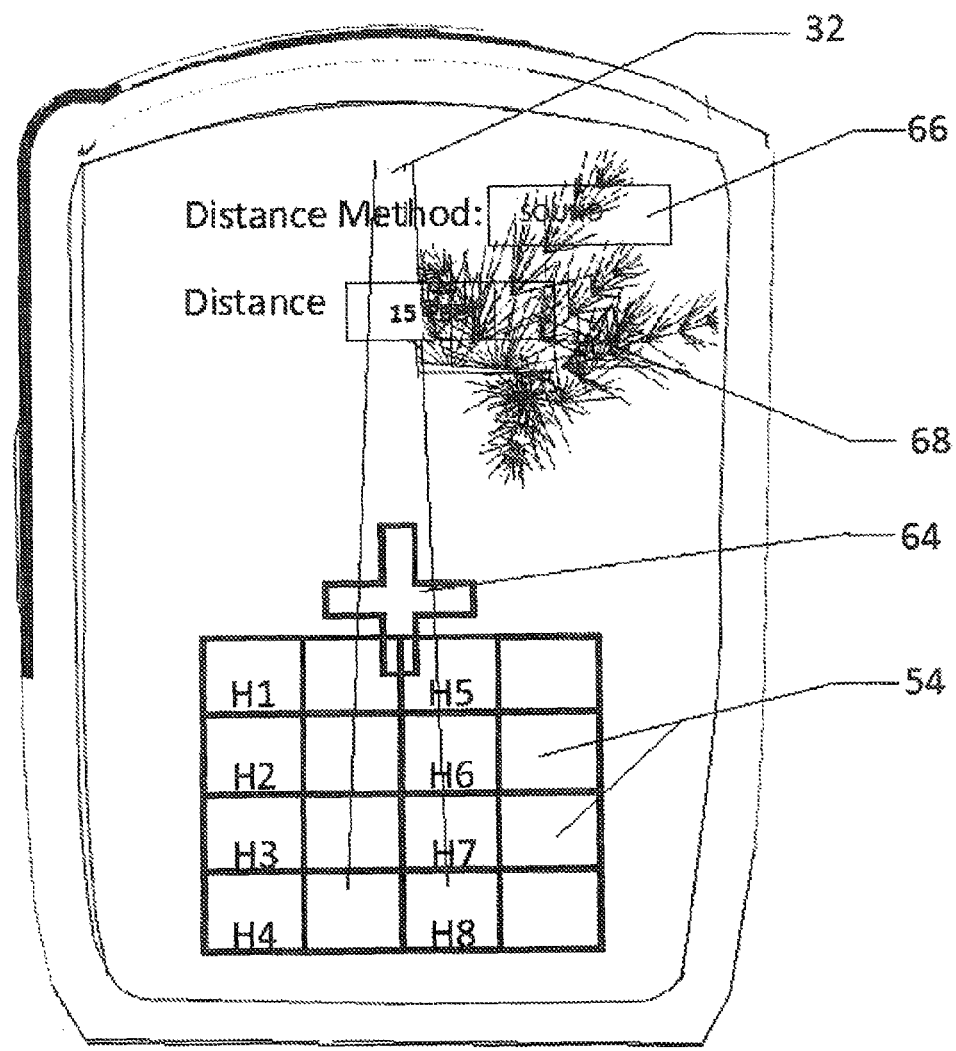
FIG. 11 is a screen view, showing the view the forester has using the present device.

In the alternative, forester 30 may choose to calculate tree height by using the ultra-sound sensor. FIG. 10 illustrates the method of determining the horizontal distance to the tree 32. Forester 30 chooses sound sensor method and the term "sound" is displayed in distance method cell 66 (see FIG. 11). If the sound sensor method is chosen, forester 30 proceeds by attaching transponder 62 to the tree 32 at a point approximately level to where the forester's eye will be when the measurements are taken. Forester 32 stands where tree tops and height measurement points are most visible and press a function key to send out first ultra-sonic pulse 36. First ultrasonic pulse 36 penetrates through underbrush and/or other trees, to transponder 62; transponder 62 sends a second ultrasonic pulse 56 back to device 10 and the device is able to take an accurate horizontal distance measurement. Once horizontal distance measurement is determined the forester 30 aims the device 10, via the camera function, at the base of the tree 32, similar to the laser distance method, illustrated from a user interface view in FIG. 11. Again, cross 64 acts as a target for forester 30 to select a particular point on tree 32 to direct the measurement. The accelerometer measures the angle to the point on the tree 32 at which the cross 64 is directed. This angle is recorded and the height is calculated by the programming within the device 10 as described above.

In the third alternative embodiment forester may choose to calculate height by using the manual method. Forester can determine the horizontal distance to a tree by using measuring tape, pacing or any other method of estimating distance not covered by the laser or sound sensor. Once horizontal distance is established, the forester then enters the determined distance and proceeds to measure the angles as in the above examples to determine height.

The preceding description contains significant detail regarding the novel aspects of the present invention. It should not be construed, however, as limiting the scope of the invention but rather as providing illustrations of the preferred embodiments of the invention. Thus, the scope of the invention should be fixed by the following claims, rather than by the examples given.

The invention claimed is:

1. A device for a forester to collect and use dendrometric data from trees and tree stands, comprising:
   a. a mobile computing device having,
      i. a memory,
      ii. a user interface,
      iii. a GPS receiver,
      iv. a sound sensor capable of emitting an ultra-sonic pulse,
      v. a computer readable code embodied on said memory;
   b. an accelerometer;
   c. a laser rangefinder;
   d. a camera;
   e. wherein said laser rangefinder is configured to determine a horizontal distance and a slope distance to said tree.

2. The device of claim 1, wherein said accelerometer is configured to determine an angular measurement based on said horizontal distance.

3. The device of claim 2, wherein said computer readable code is capable of determining a horizontal distance to said tree, an angular measurement to said tree and a height of said tree, wherein the height is based on said horizontal distance and said angular measurement.

4. The device of claim 3, further comprising an electronic compass.

5. The device of claim 4, wherein said electronic compass is a magnetometer.

6. A device for a forester to collect and use dendrometric data from trees and trees stands further comprising:
   a. a mobile computing device having:
      i. a memory;
      ii. a user interface;
      iii. a GPS receiver;
      iv. a sound sensor capable of emitting a first ultra-sonic pulse;
      v. a computer readable code;
      vi. an accelerometer;
      vii. a laser rangerfinder;
      iix. a camera;
      ix. an electronic compass;

wherein said laser rangefinder is capable of determining a horizontal or slope distance to said tree;
b. a transponder, wherein said transponder is capable receiving and then emitting a second ultra-sonic pulse upon receiving said first ultra-sonic pulse;
the sound sensor in the device then receives the pulse from the transponder;
c. wherein said first ultra-sonic pulse and a second ultra-sonic pulse have a speed;
d. wherein said second ultra-sonic pulse returns to said sound sensor after an elapsed time;
e. wherein said computer readable code is capable of calculating a first distance from said device to said transponder based upon said speed of said first and second ultra-sonic pulse and said elapsed time;
f. wherein said distance is written to said memory of said mobile computing device; and
g. wherein said computer readable code incorporates said distance into a map using said GPS receiver for viewing on said user interface.

7. The device of claim 6, further comprising an electronic compass, wherein said electronic compass acts together with said GPS receiver to incorporate said distance into said map for viewing on said user interface.

8. The device of claim 6, wherein said computer readable code includes a real time mapping software program.

9. The device of claim 6, wherein said accelerometer is configured to determine an angular measurement based on said horizontal distance.

10. The device of claim 9, wherein said computer readable code is capable of determining a horizontal distance to said tree, an angular measurement to said tree and a height of said tree, wherein the height is based on said horizontal distance and said angular measurement.

11. The device of claim 6, further comprising:
wherein said sound sensor within said device emits an ultra-sonic pulse, having a speed, to a transponder affixed to said tree;
wherein said ultra-sonic pulse has a travel time between when said device emits said ultra-sonic pulse and when said ultra-sonic pulse returns to said device;
wherein a horizontal distance is calculated based on said speed and said travel time of said ultra-sonic pulse;
wherein an angular measurement from said device to a point on said tree is calculated using said accelerometer; and
wherein said computer readable code determines a height of a tree relative to said point on said tree by a geometric formula using said horizontal distance and said angular measurement.

\* \* \* \* \*